March 25, 1958     F. J. COZZOLI     2,827,997
AUTOMATIC FILLING MACHINE FOR AMPULS OR OTHER SMALL CONTAINERS
Filed July 6, 1953     4 Sheets-Sheet 2

INVENTOR.
Frank J. Cozzoli
BY
Harold F. Scribner
ATTORNEY

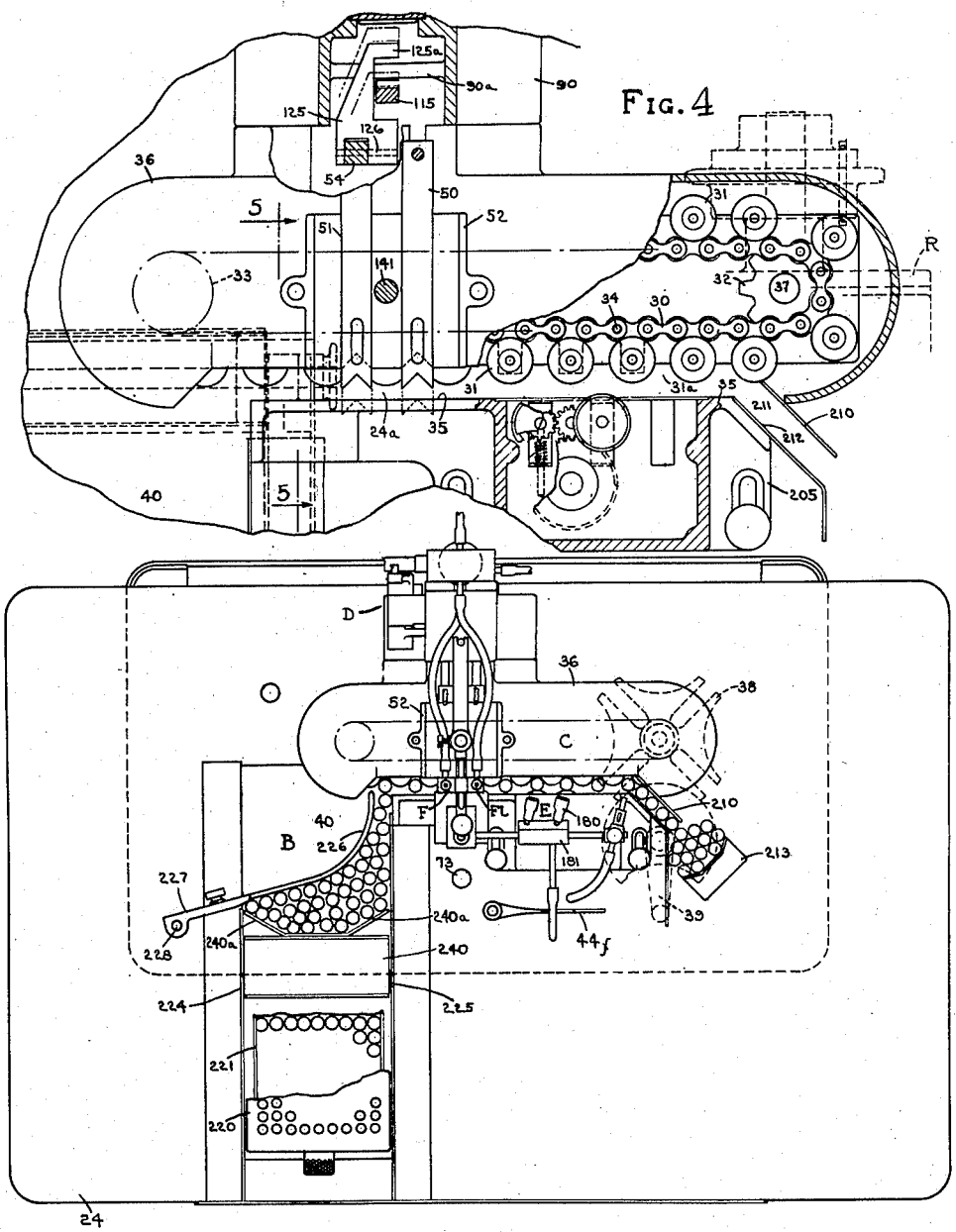

March 25, 1958 F. J. COZZOLI 2,827,997
AUTOMATIC FILLING MACHINE FOR AMPULS OR
OTHER SMALL CONTAINERS
Filed July 6, 1953 4 Sheets-Sheet 4
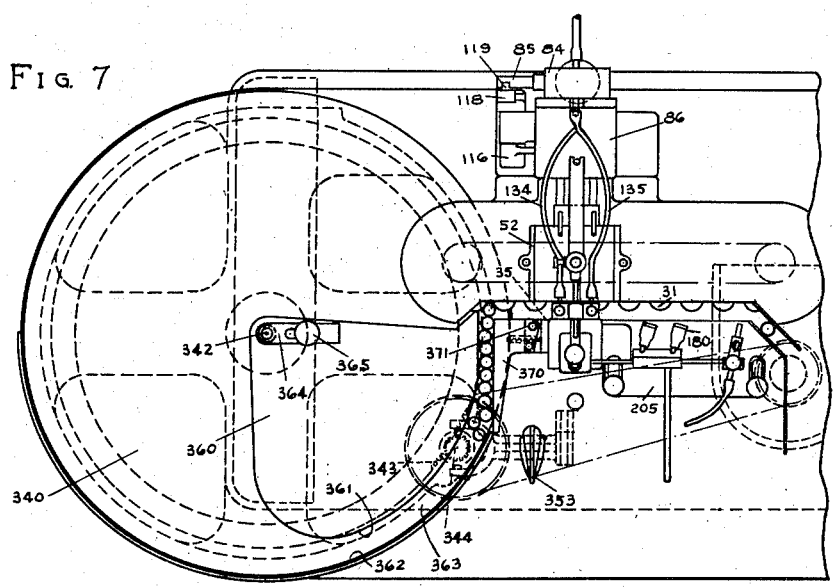
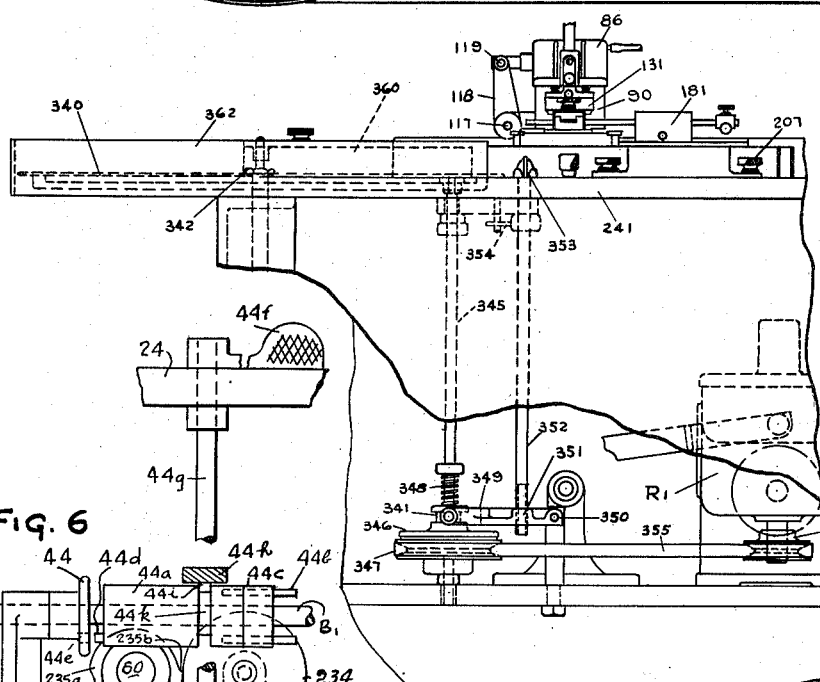
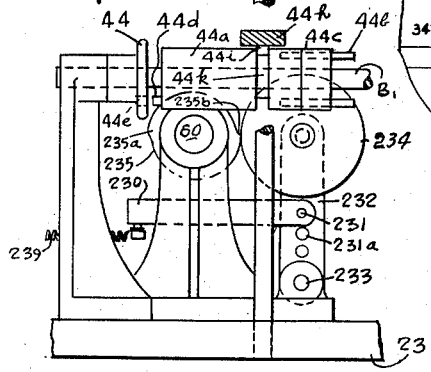
INVENTOR.
Frank J. Cozzoli
BY
Harold F. Scribner

United States Patent Office 2,827,997
Patented Mar. 25, 1958

2,827,997

AUTOMATIC FILLING MACHINE FOR AMPULS OR OTHER SMALL CONTAINERS

Frank J. Cozzoli, Plainfield, N. J.

Application July 6, 1953, Serial No. 366,356

3 Claims. (Cl. 198—30)

This invention relates to the art of filling and sealing ampuls and has for a primary objective the performance of the filling and sealing operations in an accurate, efficient, and sterile manner without manual handling of the individual ampuls.

This application is a continuation in part of my application Serial No. 283,070 filed April 18, 1952, now Patent No. 2,749,688 issued June 12, 1956.

Another aim of the invention is to supply sterilized unfilled ampuls to the filling mechanism untouched by the operator, and to perform the filling and sealing automatically to the end of maintaining the sterility of the packaged product and the avoidance of possible contamination incident to manual handling.

Still another objective of the invention is to construct an efficient filling and sealing machine adapted to receive tray lots of ampuls and mechanically to transport them individually and successively to filling, gassing, and sealing stations, for example, and thence to a delivery station where the filled and sealed ampuls may be collected for further processing as may be desired.

In attaining the objectives of the invention it is proposed to construct a machine with a processing conveyor and a loading conveyor so related that the one feeds containers to the other, and one of which is intermittently movable and the other may be intermittently movable but preferably continuously movable. In the present embodiment, the loading conveyor is continuously driven and is constructed to feed the containers upstanding to the receptacles on the processing conveyor during the dwell periods of the latter. The loading conveyor, in accordance with this invention, is designed and adapted to receive the ampuls in bulk lots and to pass them successively to the processing conveyor without manual handling.

After being positioned in the processing conveyor the ampuls are transported to a filling station whereat each is automatically centered and receives a predetermined measured quantity of the preparation to be packaged. Thereafter the filled ampuls are moved to a succeeding station where if desired they may be flushed with an inert gas to remove remaining air. After the flushing operation, the ampuls are moved to one or more sealing stations where their ends are sealed by fusion, and thereafter brought to a delivery station.

With a machine so arranged the ampuls are received from suitable sterilizers in tray lots and placed upon the loading conveyor, thereafter the loading of the ampuls on the processing conveyor and all processing operations are effected automatically and without manual touching of the ampuls. The various guides, filling needles, centering devices, etc., are preferably constructed of non-corrosive metal capable of removal and periodic sterilization or continuous exposure to sterile lamps to the end of maintaining sterile conditions in and around the ampuls through all of the processing stages, at least all the stages prior to the hermetic sealing.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 of the drawings is a front view of an ampul filling and sealing machine embodying this invention.

Figure 3 is a plan view of the machine.

Figure 4 is a plan view of portions of the processing conveyor and portions of the ampul centering means, blank detector means, and rotating means.

Figure 6 is an enlarged view of the loading conveyor clutch and bridge breaker mechanism.

Figure 7 is a plan view of a portion of a filling machine incorporating the invention but which embodies a rotary loading conveyor constructed to feed the ampuls one-by-one to the receptacles of the processing conveyor.

Figure 8 is a front view of portions of the machine illustrated in Figure 7.

Figures 2, 5:
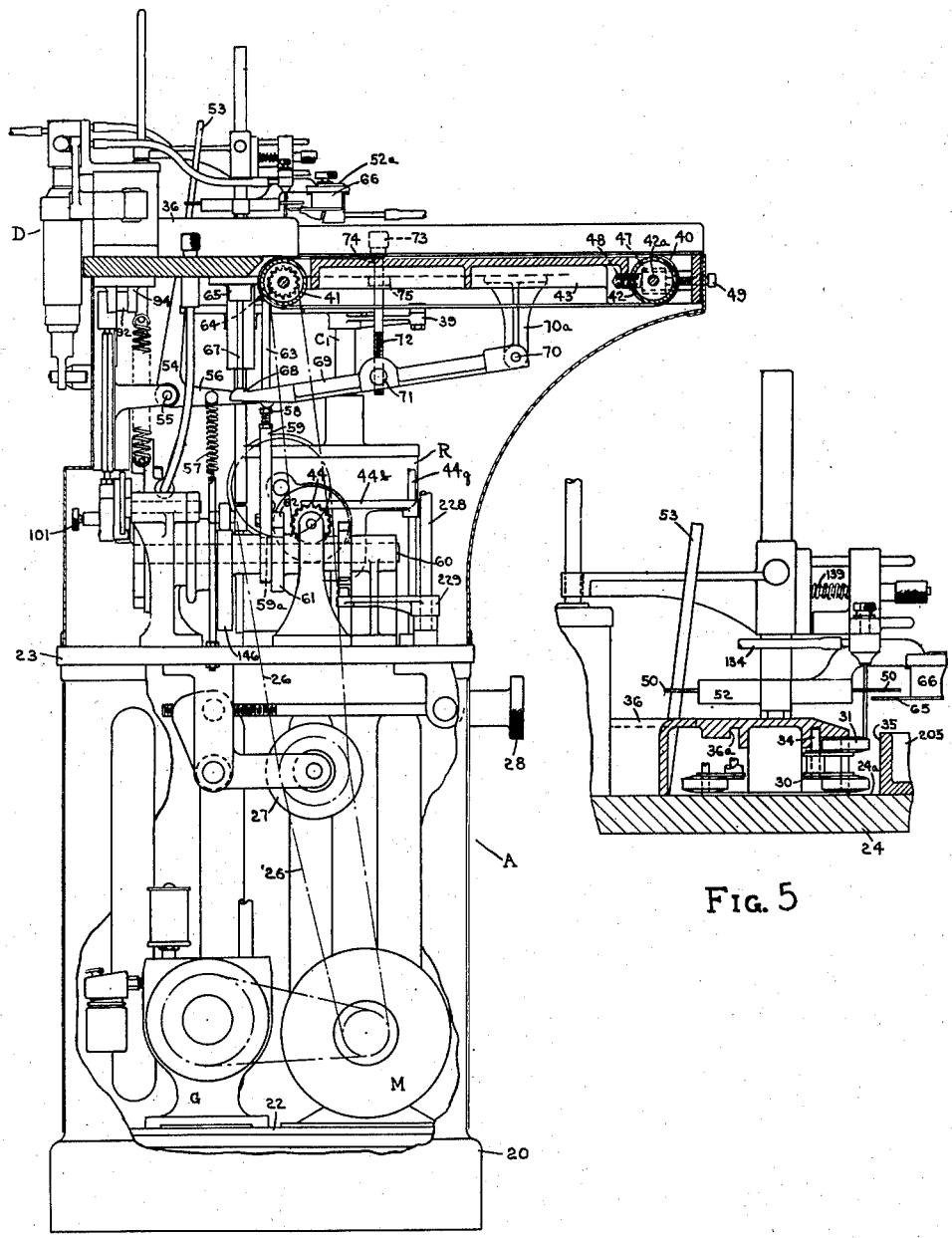
Figure 2 is a side view of the machine.
Figure 5 is a detail view along line 5—5 of Figure 4.

Referring more particularly to Figures 2 and 3 the machine therein illustrated comprises essentially a frame structure A composed of lower leg elements 20, upper panels 21, connected by shelves 22 and 23, and a top plate 24. The machine also includes a loading conveyor B, a processing conveyor C, filling mechanism D, and sealing means E, the moving elements of which derive power from a common source indicated as a motor M. In those instances wherein the sealing method requires a source of air, provision is made for an air pump G, also to be driven by the motor M. A switch Sw mounted at the side of the machine, controls the motor operations.

With the exception of the air pump drive, the drive power for all of the named mechanisms initiate with a speed reduction unit R, of conventional construction, which is equipped with three output shafts $B_1$, $C_1$, $D_1$, and one input shaft 25. The input shaft 25 connects with the motor M by means of a pulley and belt system 26 in which there is incorporated a variable speed mechanism 27 controllable with a rate control knob 28 located at the front of the machine. By turning the knob in one direction the speed of the machine is increased and by turning the knob in the other direction the speed is decreased. In this instance, the variable speed mechanism provides infinite changes through a ratio of 4 to 1, and the primary gears of the reduction unit R provide a fixed speed reduction of 40 to 1.

*Processing conveyor C*

Figure 1:
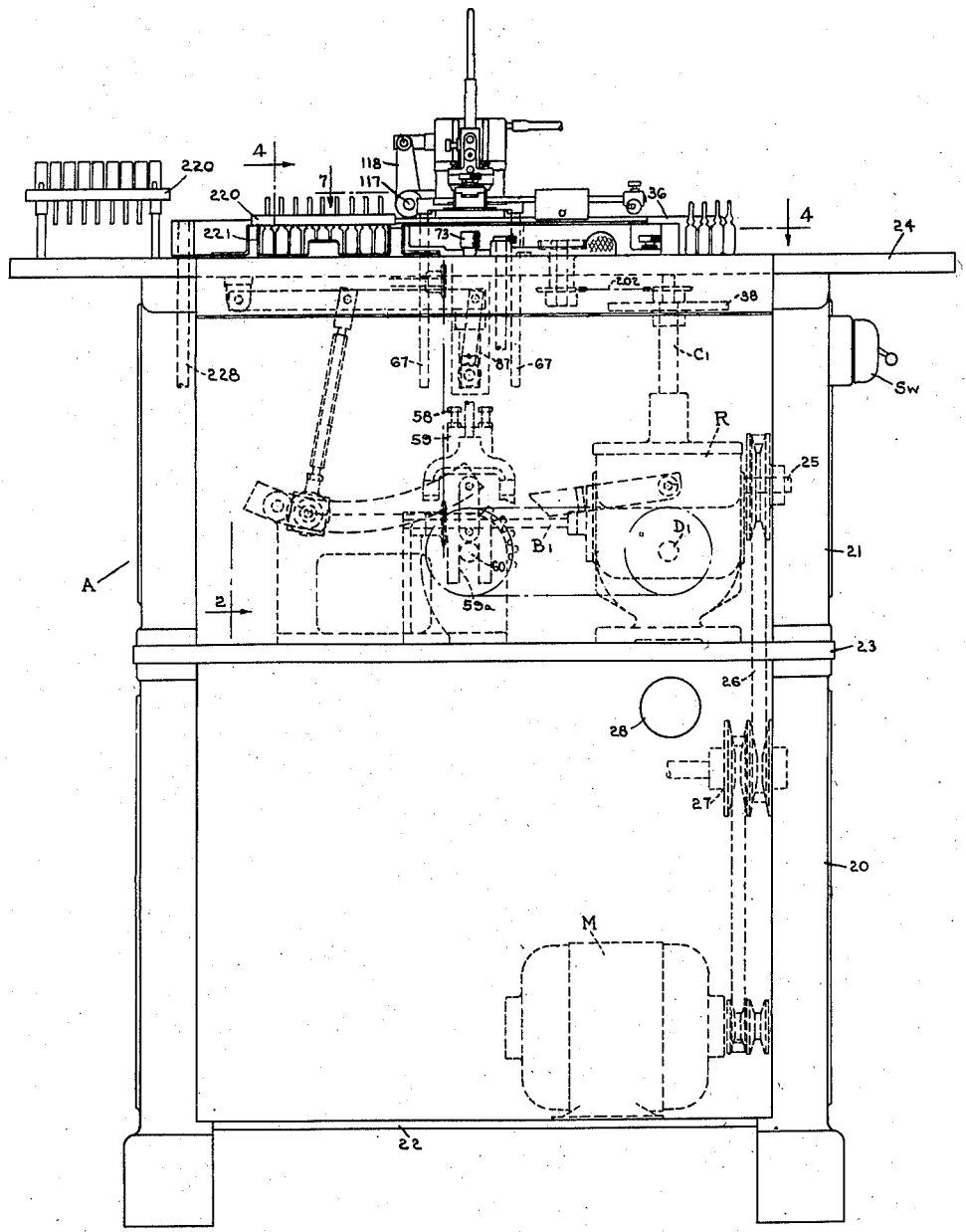

(Figures 1, 4, 5)

In the present embodiment of the invention the processing conveyor is composed of a chain of links 30, alternate ones of which carry a laterally off-set pair of rollers 31. The links of the chain track on spaced sprockets 32 and 33 journaled in a conveyor cover 36 and top plate 24, and each carries an extended pivot pin 34 that is guided in a slot 36a in the cover member 36. The guide slot 36a is provided to keep the pivot pins 34 and thereby the rollers 31, aligned in the straight run of the chain, particularly along the ampul processing side of the conveyor. As illustrated more clearly in Figure 4, the outer peripheries of adjacent rollers 31 form V-shaped recesses 31a that are adapted to receive the ampuls to be processed and to transport them from station to station. The outer side of the recesses 31a is closed by a relatively stationary but adjustable guide wall 35 for the major portions of the straight run of the conveyor. The conveyor sprocket 32 is tight on a shaft 37 that extends through the table and carries at the underside thereof a star-wheel 38 which forms part of a four-station geneva mechanism. The crank member 39 of the geneva is mounted on and driven by the reduction output shaft $C_1$. Each turn of the geneva crank 38 advances the conveyor a unit distance, this distance in the present embodiment being two conveyor chain pitches or one ampul receptacle.

Loading conveyor B

The loading conveyor of the embodiment illustrated in Figs. 1, 2, 3 and 4 comprises an endless belt 40 arranged to track a drive roll 41 and a driven roll 42, the latter being adjustable for alignment and to take up stretch, and both being journaled for rotation in a frame member 43. The frame is detachably secured to the table top 24 and is so constructed that the upper run of the belt lies substantially in the plane of the upper surface of the top 24. The conveyors B and C are arranged preferably at right angles to each other, and with the delivery end of the loading conveyor passing under the receptacles at the receiving end of the processing conveyor in such manner that an ampul standing upon the loading conveyor is urged by the belt into one of the receptacles of the processing conveyor and carried by the latter to the processing stations. On each cycle of the processing conveyor a receptacle is brought into position to receive an ampul and it, in turn, is moved laterally off the loading conveyor and into the processing line.

As hereintofore indicated the loading conveyor is normally driven at a reduced speed from the reduction unit R, through the shaft $B_1$. Shaft $B_1$ mounts a free running sprocket 44, which through a chain 45 drives a sprocket 46 that is tight on the conveyor drive roll shaft 41a. Shaft $B_1$ also carries a slidable clutch spool 44a which is keyed to the shaft by means of pins 44b that slide in matched holes provided in a fixed collar 44c. The opposite end of the clutch spool carries one or more pins 44d positioned to engage openings 44e provided in the free running sprocket 44. In the position illustrated in Figure 7, the clutch spool is disengaged from the sprocket 44, and the loading conveyor is idle. When the clutch spool is shifted to the left, the pin 44d is caused to enter opening 44e in the sprocket 44, and the loading conveyor is driven. To effect engagement and disengagement of the drive to the loading conveyor, a hand clutch lever 44f on the top of the machine is provided. The clutch lever is secured to an oscillatable shaft 44g that extends through the table top. Shaft 44g carries another radial lever 44h that has a pin 44j positioned to track in a groove 44k in the clutch spool. Thus movement of the hand lever 44f from one to the other position causes shifting of the clutch spool and engagement or disengagement of the drive to the loading conveyor. The loading conveyor is normally driven continuously and at a surface speed of the belt such that, within the range of the machine, the distance an ampul will travel in each filling cycle is always greater than the diameter of the ampul that is being loaded on the processing conveyor. This is to insure that when an empty receptacle arrives in loading position, it will receive an ampul with adequate reserve pressure thereon remaining to exert a pocketing pressure on the ampul during the initial portion of its lateral shift.

Belt stretch take-up and alignment may be effected by journaling the shaft 42a of the idler roll 42 in adjustable blocks 47. Each of the blocks is urged outwardly by a spring 48, and outward movement limited by adjustable screws 49 accessible from the front of the machine.

In the embodiment of the invention illustrated in Figs. 7 and 8 the loading conveyor B is constructed in the form of a rotary disc 340 which is driven from the main reduction unit $R_1$, through a selectively operable clutch mechanism 341. In this form of ampul feeder, the disc 340 is pivoted as at 342 so that its outer marginal portion underlies at least the initial receptacle of the processing conveyor. The underside of the disc 340 carries a ring gear 343 that is meshed by a driving pinion 344 on shaft 345. The lower portion of the shaft 345 carries clutch means 341 comprising a clutch spool and disc 346, a normally free running pulley 347, and clutch spring 348. A clutch actuating fork 349 associated with the spool element 346 is provided to effect a shifting of the element against the action of the compression spring 348 when it is desired to disengage the drive to the loading conveyor disc 340. The clutch fork 349 is pivoted at one end to a post 350 and has a threaded connection 351 with a vertical rod 352. Rod 352 extends through the table top 24, and carries an actuating pointer knob 353. Suitable stops 354 under the table top may be provided to limit the movement of the clutch actuating shaft 352 to the required extent. Pulley 347 is driven by a belt 355 that tracks a pulley 356 that is mounted on an extension of the geneva crank shaft $C_1$.

The pivotal axis 342 of the rotary disc 340 also functions as a pivot pin for an adjustable feed shoe 360. The shoe 360 normally rests upon the top of the disc 340 and is formed with a curved outer edge 361 which together with the inner face of a disc-circumscribing wall 362, forms a progressively narrowing passageway 363 leading toward the receptacles of the processing conveyor. To enlarge the passageway, i. e., for larger sized ampuls, the feed shoe may be adjusted laterally by means of a slotted pivot piece 364 that is carried by the shoe. By releasing clamp screw 365 the shoe may be shifted to produce the required size throat opening for the size ampul to be run.

At the juncture of the feed passageway 363 with the receptacles of the processing conveyor it is preferable to provide a yieldable guide piece 370. In this instance the guide piece 370 is constructed to form an extension of the outer guide 35, and is pivoted at 371 thereto. A compression spring 372 between the guide 35 and the pivoted piece 370 normally urges the pivot piece 370 to the position indicated in Fig. 10. However, if an ampul tends to bind on the leading corner thereof as the processing conveyor sweeps it off the disc, the guide piece will yield slightly and thereby prevent a crushing of the ampul at that point.

Ampul centering mechanism

As the ampul is swept off the loading conveyor it is brought into a substantially closed pocket defined by the peripheries of adjacent pairs of conveyor rollers 31 and the guide wall 35. A bottom wall or track 24a is provided by the top surface of the plate 24. In the instant embodiment, the filling station is located at F, followed by flushing station FL, along the line of travel of the ampuls. After leaving the loading conveyor, an ampul to be filled and sealed is brought in one or more indexing movements to the filling station where it stops during the lock time of the geneva mechanism. With a four-station geneva, the lock time is ¾ of a complete cycle and during this time, the neck of the ampul is centered, the filling needle injected, the ampul filled, needle withdrawn and the centering means withdrawn.

The centering means at the filling station comprises a slidable V-plate 50 that is carried in guide ways 51 provided in a vertically adjustable support 52. The V-plate 50 is provided at its rear end with a hole adapted slidingly to receive an actuating shaft 53. The shaft 53 extends downwardly through the table top and forms a part of an L-shaped lever 54 that is pivoted at 55 to a stationary part of the machine. The other arm 56 of the lever 54 extends forward and is urged by a pull spring 57 into engagement with an adjustable screw 58 on a yoke piece 59. The yoke piece 59 is slotted as at 59a at its lower end and straddles a cam shaft 60. The cam shaft 60 carries a reset cam 61 on which a cam follower 62, carried by the yoke piece 59, normally travels. The upper end of the yoke piece 59 carries a pilot bar 63 that is guided in a bearing 64 in a bracket 65 secured to the underside of the table top 24. The reset cam 61 is formed with a high portion 61a, a low portion 61b, and intermediate connecting portions 61c, so related and of such angular lengths that at least the high portion, reacting through lever 54 will hold the centering V-plate 50 withdrawn from the path of ampul travel during the indexing movement thereof, and will allow the finger to advance and center the ampul neck in the V at its end, before the needle descends, and to hold the ampul centered until the filling is completed. The forward movement or centering operation of the V-plate is performed yieldingly by the action of the pullspring 57 whereby compensation is automatically made for variations in neck size of the ampuls. The tendency of the spring urged V-plate 50 is to tip the ampuls forward, and to prevent this a relatively stationary backstop plate 65 is provided. The plate 65 is carried upon a block 66 that is adjustably mounted to an extension 52a of the support 52. As the guide wall 35 is adjusted in or out for body diameter of the ampuls to be filled, likewise is the back-stop plate 65 adjusted in or out to correct for the change in location of the center of the ampul.

In cases wherein it is desired to flush the ampul after filling, the centering mechanism described is duplicated at the flushing station, except that the reset cam 61, and yoke piece 59 may be common to both.

In the event that a blank occurs at the filling station it is desirable that the filling operation be suspended for that cycle, and to effectuate that end the reset cam is formed with its low portion 61d sufficiently reduced to provide for considerable over-run or over-travel of the centering V-plate 50, and this movement is utilized to effect a latching of a portion of the filling mechanism, preferably the valve, when a blank occurs. This ampul-detecting valve-latching mechanism will be explained in connection with the filling mechanism. Suffice it for the present to explain that the V-plate support 52 is vertically adjustable to suit different lengths of ampuls, and the no-ampul no-fill feature of this invention operates over the entire range.

To achieve the vertical adjustment, so as to position the centering V-plate reasonably close to the upper open end of the ampul, the supporting platform 52 is provided with a pair of parallel arranged guide rods 67 that extend downwardly through guide bushings in the top 24 and rest upon the end portions 68 of a two armed lever 69. The lever 69 is pivoted as at 70 to a table mounted bracket 70a and is provided intermediate its ends with a swivel nut 71. An adjusting screw 72 is threaded through the nut and is arranged to be operated from the upper side of the table 24 by means of the knurled knob 73. A clearance hole 74 is provided in the table top to receive the adjusting screw. The knob 73 above the plate 24 and a collar 75 below the plate, retain the adjusting screw against endwise movement.

*Delivery*

After sealing, the ampuls are brought successively to a delivery station where they are discharged from the conveyor. Delivery, in this instance, is effected by interposing a tongued guide 210 into the path of ampul travel. The leading end of the guide is preferably bifurcated to permit passage of the rollers 31, and when positioned at an angle to the line of travel of the ampuls each in succession engages and is displaced laterally out of the V-pockets of the conveyor rolls and into a delivery channel 211. This channel may be defined by the guide 210 on one side, and a wall 212 on the other. The wall 212 may, if desired, be a part of the housing 205 and be adjustable therewith. Also, the channel 211 may, if desired, have a flaring outlet so that successive ampuls may move laterally as well as forwardly. Should ampuls at the outer margins of the group tend to fall over before they are removed by the operator, a yieldable back-wall 213 may be provided. This back-wall 213 may comprise simply a movable lever or any such device that will function to provide an ever enlarging pocket-like enclosure for receiving and supporting the ampuls.

*Bulk loading*

As herein above indicated the containers are to be loaded preferably in bulk lots on the upper run of the loading conveyor belt 40 (Fig. 3), or upon the disc 340 (Fig. 7), though they may be placed on the belt or disc individually by hand if desired. For bulk loading of ampuls a convenient means comprises a perforated rack-plate 220 and an open-ended tray 221. The perforations in the plate are larger than the ampul necks but smaller than their body parts. Ampuls may be received from a sterilizer in inverted position in such perforated plates and the open-ended tray 221 placed upon the inverted ampuls and both tray and plate inverted in space and placed upon the conveyor belt 40 and conveyor disc 340 with the open end of the tray directed toward the processing conveyor C. After being positioned in this manner, the tray is slid from beneath the ampuls, which are still confined in the perforations of the rack-plate, thus bringing the bottoms of the ampuls into engagement with the belt or disc. The ampuls move forward with the moving conveyor, while being steadied by the rack-plate 220, until they reach the remaining ampuls of the preceding lot at which time the rack-plate is lifted off the stem ends. Until the attendant has become skilled in the loading operation, movement of the loading conveyor may be brought to rest in the manner described during the actual loading.

In the Fig. 3 embodiment the ampuls are guided toward the processing conveyor by means of side guides 224 and 225 and a throat guide 226. The guide 225 is positioned so that at least its forward end guides the leading ampul approximately central to the receiving cavity between rolls of the processing conveyor. The opposite side wall, particularly the throat region 226 thereof may be constructed to prevent the ampuls from bridging and failing to feed. One form of device for accomplishing the purpose is to construct and mount the throat guide piece 226 so as to be capable of movement to enlarge and decrease the throat opening with a frequency at least equal to the indexing cycle of the processing conveyor and preferably at a faster rate. To this end the throat piece 226, which in effect forms a continuation of the guide wall 224, is adjustably secured to an oscillatable arm 227. Arm 227 is fastened to a shaft 228 journaled in bearings provided by the table top 24 and shelf 23. Shaft 228 carries another arm 229 at a point below the table top, and the arm pivotally connects with a cross bar 230. Bar 230 is also pivotally connected as at 231 with an upstanding lever 232, and the latter is pivoted as at 233 to a fixed part of the machine. The free end of lever 232 carries a cam follower roll 234 positioned to track the periphery of a lobed cam 235 mounted on the cam shaft 60. As indicated in Figure 9, the cam 235 is provided with two progressively increasing high portions 235a and two relatively sharp descending portions 235b. The follower roller is spring tensioned, by pull spring 236, against the cam, and responds to the contour thereof as the cam revolves, slowly in one direction and rapidly in the other. These motions are transmitted, through the linkages 230, 229, 228, 227 to the throat guide 226 and causes the latter to move toward the standing ampuls slowly and away from the ampuls quickly. This repeated jarring of the ampuls in cooperation with the forward movements brought about by the movement of the conveyor has been found sufficient to break the tendency of the ampuls to bank up or bridge in the throat region leading to the processing conveyor. A continued flow of ampuls to the receptacles of the processing conveyor may, in this manner, be assured. The magnitude of the oscillation imparted to the guide 226 may be varied to suit requirements by shifting the location of link pivot 231 on the lever 230. For this purpose the lever 230 is provided with a series of pivot pin openings 231a.

For the smaller sizes of ampuls especially, a follow block 240, may to advantage be employed. As herein illustrated the follow-block may comprise a member provided with extending arms 240a positioned so as to group the ampuls and thereby promote their travel as a group. The arms 240a also functions to back-up the ampuls so that the outer ones do not fall over. It will be understood also that the follow-block 240 is relatively light in weight so that it cannot, by reason of the drag of the conveyor belt 40 thereon, exert too great a pressure upon the bank of ampuls. When reloading the conveyor, the follow-block is removed, and replaced behind the new bank of ampuls.

In the embodiment illustrated in Figs. 7 and 8, the same method of bulk loading the disc 340 may be practiced. With this type of conveyor, the ampuls are caused to move angularly against the side of the feed shoe 360 which presents a progressively-changing slanted surface athwart their line of travel. In consequence of this oblique action and the fact that the outer portions of the disc travels faster than more inwardly located portions, the ampuls "flow" outwardly toward the margins of the disc and move along the retaining wall 362 in more-or-less single file relation toward the entrance throat leading to the processing conveyor. Due to the varying rate of angular travel of the ampuls and the progressively changing shape of the opposed retaining surfaces of the passageway self-feeding of ampuls is made possible and "bridging" of the ampuls is effectively eliminated without recourse to other means.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. In a machine for processing containers such as ampuls and vials, an endless chain-type conveyor adapted to receive and transport the containers from a loading station to and through a processing station, said conveyor comprising a series of spaced elements affording uniformly spaced open-sided recesses for pocketing the containers, a relatively stationary wall member opposite the open-sided recesses and extending from a loading station to a processing station for confining the containers in the recesses, and a relatively stationary track member underlying said recesses so as to form a bottom support for the containers, means for placing containers into the recesses of the processing conveyor comprising a rotatable table member positioned adjacent the processing conveyor and in underlying relation therewith at the loading station so that the surface of the table forms a bottom wall to the recesses in the processing conveyor while they are successively at the loading station said table member providing in effect a continuation of the aforesaid track of the processing conveyor, means for actuating said processing conveyor intermittently whereby to position the recesses thereof successively at the loading station, means for rotating said rotatable table continuously in a direction toward the open-sided recesses in the processing conveyor, and relatively stationary guide means overlying the rotatable table for guiding the containers successively into the recesses of the processing conveyor as the latter moves into the loading station, said means for rotating the table members being adapted to impart thereto a surface speed sufficient to move successive containers into the successive recesses of the processing conveyor during the dwell periods of the latter at the loading station.

2. The combination of claim 1 in which the relatively stationary guide means overlying the rotatable table is mounted for lateral adjustment relative to the leading end of the relatively stationary wall member to suit containers of a given size and in which said leading end of the wall member is yieldingly mounted to avoid crushing the containers at the start of their movement out of the loading station.

3. The combination of claim 1 in which the relatively stationary guide overlying the rotatable table is curved in a form approximating a spiral and with the outer end thereof leading to the loading station of the processing conveyor and serving to arrange and guide the containers single-file toward the loading station.

References Cited in the file of this patent

UNITED STATES PATENTS

| | | |
|---|---|---|
| 1,075,891 | Ayars | Oct. 14, 1913 |
| 1,196,442 | Eick | Aug. 29, 1916 |
| 1,431,702 | Smend et al. | Oct. 10, 1922 |
| 1,454,931 | Konefes | May 15, 1923 |
| 1,481,431 | Plumb | Jan. 22, 1924 |
| 1,574,307 | Risser | Feb. 23, 1926 |
| 1,990,549 | Kimball | Feb. 12, 1935 |
| 2,043,969 | Kutchera | June 9, 1936 |
| 2,296,868 | Pechy | Sept. 29, 1942 |
| 2,373,600 | Richey | Apr. 10, 1945 |
| 2,423,441 | Dennie | July 8, 1947 |
| 2,511,534 | Koppisch et al. | June 13, 1950 |
| 2,749,688 | Cozzoli | June 12, 1956 |